Oct. 4, 1949.　　　W. YASZAY ET AL　　　2,483,958
FOLDING SHOPPING CART
Filed Nov. 10, 1947
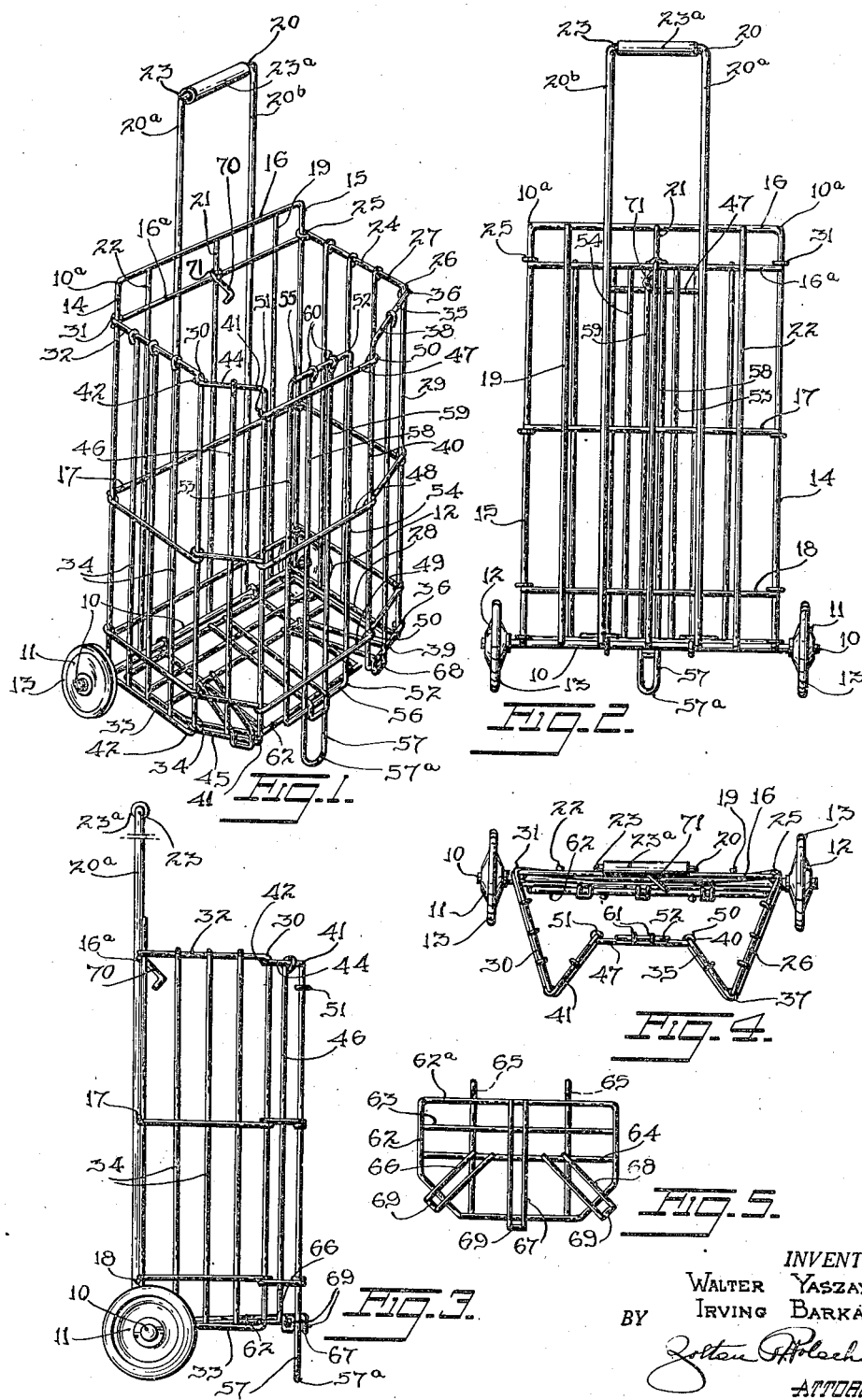
INVENTORS
WALTER YASZAY
IRVING BARKAN
BY
ATTORNEY

UNITED STATES PATENT OFFICE 2,483,958

FOLDING SHOPPING CART

Walter Yaszay, Bronx, and Irving Barkan,
Brooklyn, N. Y.

Application November 10, 1947, Serial No. 784,978

4 Claims. (Cl. 280—36)

This invention relates to an improved wheeled parcel carrier cart, for assisting shoppers to take home large packages or groups of many packages, without the necessity of carrying them.

One of its objects is to provide a carrier with a wire basket having side sections hinged to a back section and a front section folding into a plurality of sub-sections between the side sections, to collapse the basket.

Another object of the invention is to provide a wheeled packaged carrier with a foldable or hinged bottom section, having holding hooks extending forwardly through each of the sub-sections of the folding front section, to rigidly hold them in their open package supporting positions.

A still further object of the invention is the provision of a wheeled package carrier which will have increased capacity when fully opened, and greater rigidity to support the packages placed in the basket, and which can be quickly folded to fit into a small storage space.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front perspective view, showing the basket of the wheeled package carrier in open position.

Fig. 2 is a rear elevation thereof.

Fig. 3 is a side elevational view.

Fig. 4 is a top plan view, showing the basket partly collapsed, and illustrating the hinge joints thereof.

Fig. 5 is a top plan view of the bottom section.

Referring to the drawings, which illustrate the practical embodiment of the invention, 10 designates an axle having ground wheels 11 and 12 on the outer ends thereof, each being provided with a rubber tire or tire ring 13.

An inverted U-shaped frame 10ª comprising parallel vertical side bars 14 and 15, and a cross top bar 16, is secured by the welding of the lower ends of the side bars 14 and 15 to the axle bar 10. Horizontal or cross bars 16ª, 17 and 18 are secured at their ends to the side bars 14 and 15, and these cross bars are spaced vertically from each other.

Additional vertical bars 19, 21 and 22 are welded at their lower ends to the axle bar 10, and at their upper ends to the top cross bar 16 of the U-shaped frame 10ª.

A handle frame 20, of U-shaped construction, and including the vertical side bars 20ª and 20ᵇ, and the top handle cross bar 23, is secured to the U-shaped frame 10ª, by welding the vertical side bars 20ª and 20ᵇ to the cross bar 16, and to the axle bar 10.

The two U-shaped frames, 10ª and 20, the axle, and the cross bars 16, 16ª, 17 and 18 thus form the back section of the basket of the wheeled carrier. A handle tube 23ª is mounted on the cross bar 23.

To the vertical side bar 15 of the U-shaped frame 10ª the end basket section 24 is connected by the hinge eyes 25. This basket section includes a U-shaped frame 26, having horizontal top and bottom bars 27 and 28, and a vertical connecting bar 29. To the vertical side bar 14 a similar U-shaped frame 30 is connected by the hinge eyes 31 of the top and bottom horizontal bars 32 and 33, which are connected to each other by means of the vertical bars 34.

To the vertical bar 29 of frame 26 another U-shaped frame 35 is connected by the hinge eyes 36 of the horizontal top and bottom bars 38 and 39, which are connected to each other by means of the vertical bar 40. To the vertical bar 34 of frame 30 another U-shaped frame 41 is connected by the terminal hinge eyes 42 of the horizontal top and bottom bars 44 and 45, which are connected to each other by means of the vertical bar 46.

To the vertical bar 40 of the U-shaped frame 35, horizontal bars 47, 48 and 49 are connected by the hinge eyes 50, and the hinge eyes 51 of these bars are connected to the vertical bar 46 of the U-shaped frame 41. The horizontal cross bars 47, 48 and 49 are connected to each other by means of the frame 52, which includes two vertical bars 53 and 54, and the connecting end horizontal bars 55 and 56, the points of intersection being welded to each other. A U-shaped frame 57 consisting of vertical side bars 58 and 59 is connected by eyes 60 to the top cross bar 55. The lower end of the U-shaped frame 57 is extended below the bottom cross bar 56 of the cooperating frame 52, to provide a rest 57ª for supporting the basket, when in either an open or a closed position.

The foldable sections of the basket are held in open position by means of a bottom basket section frame 62, which comprises horizontal bars 62ª, 63 and 64, having terminal hinge eyes 65, which are mounted on the axle 10. This bottom basket section is provided with U-shaped loops 66, 67 and 68 each having a hook 69 on its outer end.

The hook 69 of the loop 66 engages the frame 41, the hook 69 of the loop 67 engages the frame 52, and the hook 69 of the loop 68 engages the frame 35, to hold the same in open position, as shown in Figs. 1 and 3.

To collapse or fold the basket the bottom section is forced upwardly, and the three frames 35, 52 and 41, which make up the sectional front wall of the basket, are folded inwardly, as shown in Fig. 4. The sectional front wall, made of these sections, is then secured in place by means of the latch hook 70, which is hinged by its eye 71 to the bar 21.

The side frames 26 and 30 are not constructed of sections which fold on each other, so that the side walls of the open basket offer greater rigid support for parcels of packages contained in the basket. The sectional and folding construction of the front wall provides a container basket of greater capacity than is otherwise possible, and allows the front wall to yield under the pressure of the load of the packages or parcels.

When the sectional front wall is collapsed against the rear wall of the basket, the one frame side wall sections will fold over and act to compress the sectional front wall in its collapsed condition, and thus provide a more compact and stable folded basket structure.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A collapsible wheeled package carrier, comprising a wheeled axle, a U-shaped back frame having side bars secured to the axle, a U-shaped handle frame secured to said back frame and extending above the same to provide a handle, a U-shaped frame having horizontal top and bottom bars provided with terminal hinge eyes secured thereby to the side bars of the back frame, a central frame, and a U-shaped frame hinged to each side of the central frame and having top and bottom bars provided with terminal hinge eyes connected thereby to the sides of the third-named U-shaped frames.

2. A collapsible wheeled package carrier, comprising a wheeled axle, a U-shaped back frame having side bars secured to the axle, a U-shaped handle frame secured to said back frame and extending above the same to provide a handle, a U-shaped frame having horizontal top and bottom bars provided with terminal hinge eyes secured thereby to the side bars of the back frame, a central frame, and a U-shaped frame hinged to each side of the central frame and having top and bottom bars provided with terminal hinge eyes connected thereby to the sides of the third-named U-shaped frames, including a bottom frame section hinged to said axle and provided with a hook arm to engage the central frame and each of the frame sections hinged thereto.

3. A collapsible wheeled package carrier, comprising a wheeled axle, a rigid non-folding back frame secured to said axle, a central forward frame section, and a pair of hinged side frame sections hingedly connected to each other and to the sides of the central frame section and to the sides of the back frame, and a bottom frame section hinged to said axle and provided with loops having hooks on their forward ends to engage the central frame section and the foremost one of the pair of side frames hinged to each side of said central frame section.

4. A collapsible wheeled package carrier comprising a horizontal axle, wheels rotatively mounted on the ends of said axle, an inverted U-shaped back frame having the lower ends of its side arms secured to said axle inward of said wheels, an inverted U-shaped handle frame secured to said axle and back frame and extended above said back frame to provide a handle, a tubular handle grip on the upper arm of said handle frame, frames having top and bottom bars pivotally connected at their rear ends to the side bars of said back frame, a central frame, frames hinged to each side of said central frame and having top and bottom bars pivotally connected at their rear ends to said frames, a hook pivotally connected to said back frame to be engaged with said central frame in the collapsed position of said frames to hold the same collapsed.

WALTER YASZAY.
IRVING BARKAN.

REFERENCES CITED

The following references are of record in the file of this patent:

UNITED STATES PATENTS

| Number | Name | Date |
|---|---|---|
| 2,371,472 | Ruff et al. | Mar. 13, 1945 |
| 2,425,107 | Martin | Aug. 5, 1947 |